(12) United States Patent
Touyeras

(10) Patent No.: US 9,181,962 B2
(45) Date of Patent: Nov. 10, 2015

(54) ENGINE COMPRESSOR, PARTICULARLY AIRCRAFT JET ENGINE COMPRESSOR, FITTED WITH AN AIR BLEED SYSTEM

(75) Inventor: Armel Touyeras, Combs la Ville (FR)

(73) Assignee: SNECMA, Paris (FR)

( * ) Notice: Subject to any disclaimer, the term of this patent is extended or adjusted under 35 U.S.C. 154(b) by 561 days.

(21) Appl. No.: 13/637,896

(22) PCT Filed: Apr. 5, 2011

(86) PCT No.: PCT/FR2011/050762
§ 371 (c)(1),
(2), (4) Date: Sep. 27, 2012

(87) PCT Pub. No.: WO2011/124839
PCT Pub. Date: Oct. 13, 2011

(65) Prior Publication Data
US 2013/0022452 A1    Jan. 24, 2013

(30) Foreign Application Priority Data
Apr. 7, 2010 (FR) ...................... 10 52634

(51) Int. Cl.
*F01D 9/04* (2006.01)
*F04D 29/68* (2006.01)
*F02C 9/18* (2006.01)

(52) U.S. Cl.
CPC ................ *F04D 29/681* (2013.01); *F02C 9/18* (2013.01)

(58) Field of Classification Search
None
See application file for complete search history.

(56) References Cited

U.S. PATENT DOCUMENTS

| 4,155,680 | A | 5/1979 | Linko, III et al. |
| 4,362,465 | A | 12/1982 | Riollet et al. |
| 5,059,093 | A * | 10/1991 | Khalid et al. .................. 415/115 |
| 6,550,254 | B2 * | 4/2003 | Proctor et al. .................. 60/785 |
| 7,594,793 | B2 * | 9/2009 | Guemmer ...................... 415/144 |
| 8,220,276 | B2 * | 7/2012 | Clemen et al. .................. 60/785 |
| 2005/0081530 | A1 | 4/2005 | Bagnall et al. |

FOREIGN PATENT DOCUMENTS

| FR | 2 914 705 | 10/2008 |
| GB | 2 407 142 | 4/2005 |
| WO | 80 00729 | 4/1980 |

OTHER PUBLICATIONS

International Search Report Issued Jun. 8, 2011 in PCT/FR11/50762 Filed Apr. 5, 2011.

* cited by examiner

*Primary Examiner* — Christopher Verdier
*Assistant Examiner* — Justin Seabe
(74) *Attorney, Agent, or Firm* — Oblon, McClelland, Maier & Neustadt, L.L.P.

(57) ABSTRACT

A compressor including at least one cascade of fixed vanes, the vanes of which are mounted on a wall and between them form air-flow passages, and an air bleed system which bleeds air from the passages between two vanes, through openings made in the wall, the openings being discontinuous and each including a plurality of orifices arranged one behind the other in a direction of the air flow. An upstream orifice of each opening has a larger cross-sectional area than downstream orifices of the opening, and a number and cross section of the downstream orifices are adjusted to suit a predetermined bleed-off flow rate.

5 Claims, 2 Drawing Sheets

ENGINE COMPRESSOR, PARTICULARLY AIRCRAFT JET ENGINE COMPRESSOR, FITTED WITH AN AIR BLEED SYSTEM

BACKGROUND OF THE INVENTION

1. Field of the Invention

The present invention concerns the domain of engine compressors, particularly of aircraft jet engine compressors incorporating air bleed systems.

2. Description of the Related Art

It is known that the compression system of a jet engine (and in particular, the high pressure compressor) is one of the most critical components of the engine. The compressor of a jet engine is made up of several successive compression stages, each stage comprising a moving cascade of vanes (rotor) and a fixed cascade of vanes (stator).

As it passes into a fixed cascade of vanes, the air is diverted, causing a loss of speed and an increase in pressure. In these conditions, aerodynamic losses due to friction, also called diffusion losses, occur. These losses result in a degradation of compressor performance. In the vicinity of the walls of the airflow channel, these losses combine with friction losses along the walls and form 3D flows causing additional high losses.

Furthermore, it is known that, in the case of an aircraft jet engine, air at high pressure is generally bled off inside the high pressure compressor, principally for cooling requirements or for operating various systems of the jet engine or aircraft.

An installation with cascades of vanes is known from Patent FR-2 166 494, incorporating at least one cascade of vanes, fixed or moving, with a fluid flow passing through it, and comprising a succession of vanes supported by at least one side wall. Each passage defined by two successive vanes and the side wall incorporates at least one localized suction opening formed in this side wall and connected to suction means disposed such that the pressure at the suction openings is of the same order of magnitude as the static pressure of the local flow in the passage under consideration. Patent FR-2 166 494 furthermore provides a perforated wall arranged in a suction opening having an elongated shape, formed facing a passage between two successive fixed vanes, in a wall of the compressor casing, which serves to limit the suction rate.

On account of a large passage cross section enabling sufficient suction to be obtained, such a suction opening generally has dimensions which are large compared with those of the channel between two vanes. Therefore, as the pressure gradients in this channel are high, local fluid recirculation or ejection occurs. This recirculation, which interferes with suction, interferes with the airflow and reduces the efficiency of the air bleed system. This air bleed system is therefore not optimum, nor is the corresponding engine.

Furthermore, a compressor is known from document GB 2 407 142 that bleeds air at the passages between two vanes through openings made in a wall, which are discontinuous.

BRIEF SUMMARY OF THE INVENTION

The Applicant Company has set itself the objective of providing a compressor enabling the degradation of performance associated with losses in the wall areas of the fixed vanes to be limited.

According to the invention, the compressor, comprising at least one fixed cascade of vanes, the vanes of which are mounted on a wall and between them form airflow passages, and an air bleed system, which bleeds air from the passages between two vanes through openings made in said wall, said openings being discontinuous and each provided with a plurality of orifices arranged one behind the other in the direction of the airflow, is characterized in that the upstream orifice of each opening has a cross-sectional area larger than the areas of the cross sections of the downstream orifices of the opening, and in that the number and cross sections of the downstream orifices are adjusted to suit a predetermined suction flow.

The solution proposed by the present invention therefore consists of bleeding air from the passages between two vanes through a plurality of orifices arranged one behind the other in the direction of the airflow, instead of a single orifice. The distribution of suction over several orifices enables efficient suction at each bleed point (no reversal of the airflow direction), at the same time preventing the recirculation that would arise in a single bleed (or suction) orifice of large dimensions.

The present invention therefore allows the degradation of compressor performance associated with losses in the areas of the walls of the fixed vanes to be limited by carefully sited low momentum air bleed.

This solution furthermore allows the same flow (which will be re-used for example inside the engine or directed toward the aircraft), to be bled off as from a single orifice, at the same time ensuring a reduction in secondary losses in the cascade of vanes.

Moreover, the upstream orifice of each opening, whose function is to prevent separation (by means of suction upstream, allowing the onset of any separation to be prevented or at least delayed), has a cross-sectional area larger than the areas of the cross sections of the downstream orifices of the opening. Also, in a preferred manner, this upstream orifice is centered in relation to a position situated laterally near the suction side of a vane and axially at between 10% and 30% of the axial length of the vane from its upstream extremity.

Furthermore, the function of the downstream orifices of an opening is to reduce the intensity of separation, once it has begun, by extracting low energy fluid.

Suction thus discretized into several orifices and established according to certain criteria further specified below therefore allows separation in the cascade of vanes to be controlled.

Moreover, it will be noted that the aforementioned document GB 2 407 142, although it provides successive orifices in the direction of the airflow, does not in particular describe the various features according to the invention, between the upstream orifice (with the larger cross section) and the downstream orifices (whose number and sizes are adjustable), for enabling the aforementioned functions (preventing separation, reducing intensity) to be obtained.

According to one feature of the invention, the number and cross sections of the orifices of an opening depend on a predetermined suction flow (generated by said air bleed system). Moreover, the number N of orifices of an opening preferably satisfies the following relation:

$$\Delta\beta \cdot (S/C)/(N \cdot D) \leq 300$$

in which:
- $\Delta\beta$ represents the deviation of the fluid on passage through the cascade of vanes;
- S/C represents the relative pitch of the cascade of vanes; and
- D represents said predetermined suction flow.

Within the context of the present invention, the orifices of an air bleed opening are therefore different from each other in terms of function and geometry.

Furthermore, in order to improve suction, the upstream orifice of at least some of said openings exhibits, through the wall, a shape slanting in a downstream direction and/or a streamlined shape.

The air bled from the compressor is then re-injected, in a customary manner, into a manifold to cool or ventilate the engine system or to supply the air system of the aircraft equipped with said engine. The characteristics of the air bleed system depend on the engine architecture and general specifications.

Furthermore, the present invention also concerns an engine, particularly an aircraft jet engine incorporating at least one compressor of the aforementioned type.

BRIEF DESCRIPTION OF THE SEVERAL VIEWS OF THE DRAWINGS

Other features and advantages will be apparent on reading the description that follows, accompanied by the attached drawings, where.

DETAILED DESCRIPTION OF THE INVENTION

Figure 1A:
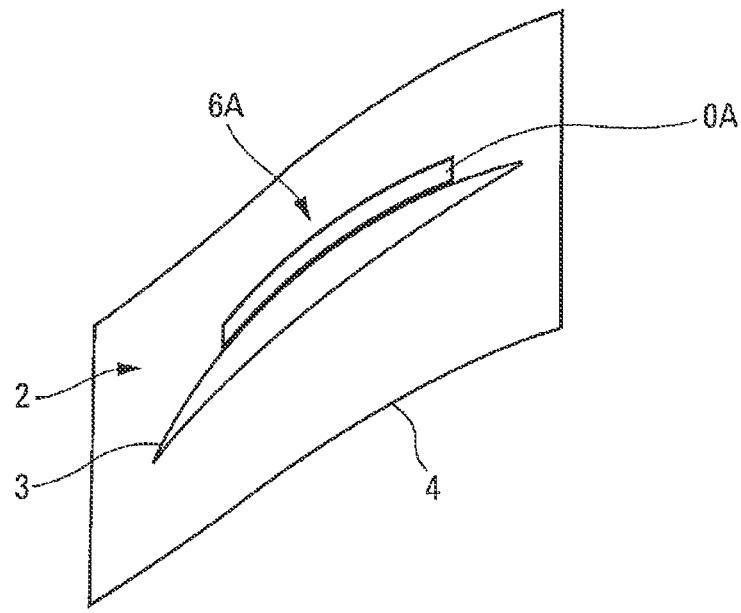
FIGS. 1A and 1B show, in diagram form, an air bleed opening made in a wall supporting compressor vanes, according to the prior art and in accordance with the present invention, respectively.

The present invention relates to a compressor 1 of an engine, particularly of an aircraft jet engine fitted with an air bleed system.

It is known that a jet engine compressor is made up of several successive compression stages, each stage comprising a moving cascade of vanes (rotor) and a fixed cascade of vanes 2 (stator).

A fixed cascade of vanes 2 (flow straightener) incorporates vanes 3, which are mounted on a wall 4 and which together form airflow passages 5.

A compressor 1 as considered in the present invention also incorporates a standard air bleed system (not illustrated), which bleeds air from the passages 5 between two vanes 3, through openings 6 made in said wall 4. In a preferred embodiment, an opening 6 is provided in each passage 5 between two successive vanes 3.

FIG. 1A shows, in diagram form, an opening 6A designed to bleed air, which conforms to the prior art. This opening 6A includes a single orifice OA. This single orifice OA exhibits a large passage cross section, such that its dimensions are large compared with those of the channel formed by the two vanes 3, between which it is located. On account of these features, local recirculation or ejection of fluid occur, which interfere with suction and reduce the efficiency of the air bleed system and the engine performance.

Figure 1B:
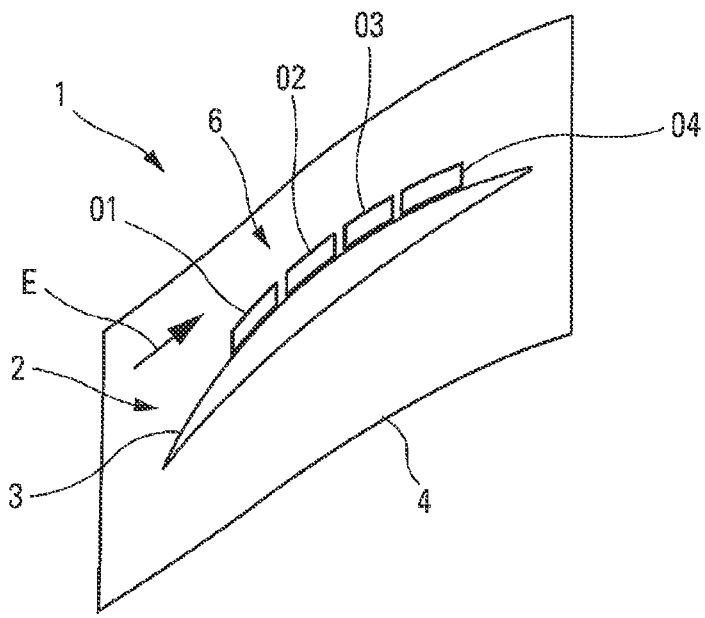

In order to remedy this disadvantage, the compressor 1 conforming to the invention incorporates openings 6 designed to bleed air, which are discontinuous and each provided with a plurality of orifices O1, O2, . . . , ON arranged one behind the other in the direction E of the airflow, along the suction side of a vane 3 as illustrated in FIG. 1B (for which N equals 4).

The distribution of suction over several orifices O1 to ON (instead of a single orifice OA) enables efficient suction at each bleed point (no reversal of the airflow direction), at the same time preventing recirculation which arises in a single large bleed orifice OA.

The present invention therefore allows the degradation of performance of the compressor 1, associated with losses in the areas of the walls of the vanes 3 of fixed cascade of vanes 2, to be limited by a carefully sited low momentum air bleed.

This solution furthermore allows the same flow (which will be re-used for example inside the engine or directed toward the aircraft in the case of an aircraft engine), to be bled off as from a single orifice OA, at the same time ensuring a reduction in secondary losses in the cascade of vanes 2.

Moreover, the function of the upstream orifice O1 of each opening 6, in the direction E of the airflow, is to prevent separation by means of suction upstream, allowing the onset of any separation to be prevented or at least delayed, and the function of the other orifices O2 to ON of the opening 6, called the downstream orifices, is to reduce the intensity of separation, once it has begun, by extracting low energy fluid along the section.

Figure 2:
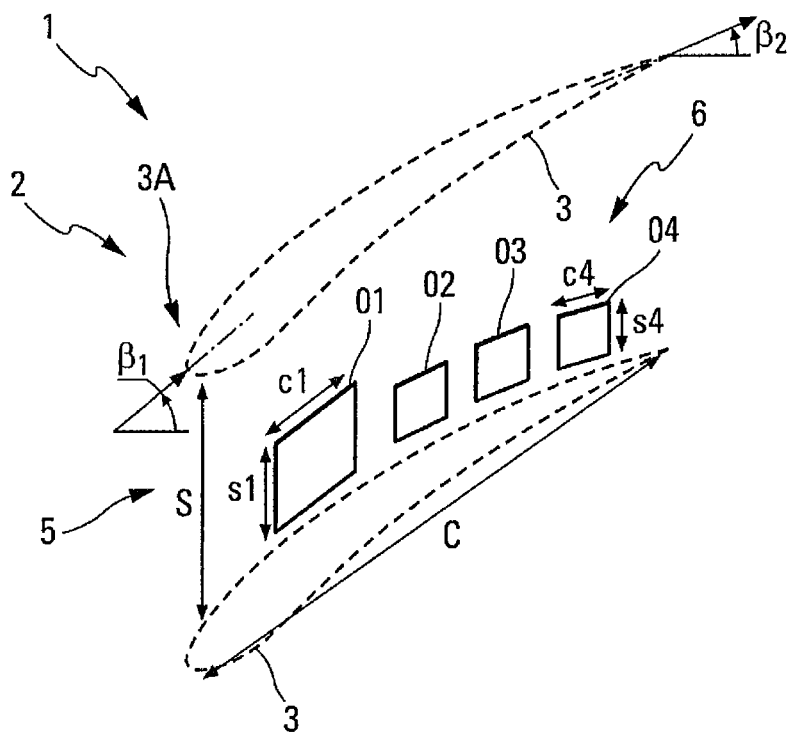
FIG. 2 shows, in diagram form, particular features of a preferred embodiment of the invention.

To that effect, the upstream orifice O1 of each opening 6 preferably has a cross-sectional area larger than the areas of the cross sections of the downstream orifices O2 to ON of the opening 6, as illustrated in FIG. 2.

Also, in a preferred manner, this upstream orifice O1 is centered in relation to a position situated laterally near the suction side of a vane 3 and axially (that is to say along the axis of the compressor 1) at between 10% and 30% of the axial chord in order to provide suction at singular points of the airflow (called separation centers). The function of this orifice O1 is to enable suction of the part of the airflow that is the cause of the separation that occurs downstream (center). For these reasons, this orifice O1 has specific characteristics (fixed upstream position, cross section larger than downstream orifices O2 to ON, and a streamlined air intake as described below).

The flow to be achieved is generally of the order of a few percent depending on the engine specifications and the cooling function provided by the suction air. As an illustration, 1% may be planned in order to ensure a minimal suction efficiency, and up to 5 to 6% for a maximum bleed off at compressor 1. The number and cross sections of the downstream orifices O2 to ON are adjusted according to the flow required by the engine functions, as described below.

The geometry and arrangement of the orifices O1, O2, . . . , ON along the suction side of a vane 3, and compliance with discretization criteria, are necessary to guarantee the full effectiveness of the present invention, the objective of which is to reduce additional aerodynamic losses of the same order of magnitude as the reduction in loss provided by an equivalent continuous suction slot.

The orifices O1, O2, . . . , ON may exhibit cross sections of different geometries, particularly circular, rectangular or square geometries. In the example of FIG. 2, for orifices having rectangular cross sections:

si represents the width of the orifice of order i; and
ci represents the length of the orifice of order i.

Moreover, in the case of a circular cross section, si=ci=ri, where ri represents the radius of the orifice of order i.

According to one feature, the number N and the cross-sectional areas of the orifices O1, O2, . . . , ON of an opening 6 depend on a predetermined suction flow. Also, said number N preferably satisfies the following relation:

$$\Delta\beta \cdot (S/C)/(N \cdot D) \leq 300$$

in which:
- Δβ represents the deviation of the fluid on passage through the cascade of vanes 2;
- Δβ=β2−β1, where β1 and β2 are the angles between, on the one hand, the axis of the compressor 1 and, on the other, the general direction of flow of the fluid, respectively at the upstream extremity 3A and the downstream extremity of the vane 3, as illustrated in FIG. 2;
- S/C represents the relative pitch of the cascade of vanes 2, where S is the distance between two successive vanes 3 and C is the chord of a vane 3; and
- D represents said predetermined suction flow (generally between 1% and 5%).

Figure 3:
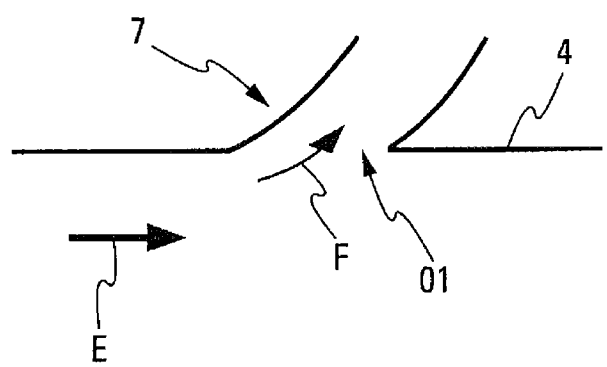
FIG. 3 shows, in diagram form, a particular embodiment of an upstream orifice of an air bleed opening.

Furthermore, in one particular embodiment, in order to prevent or reduce perturbations with the aim of improving suction, the upstream orifice O1 of the openings 6 exhibits, through the wall 4, a shape slanting in a downstream direction or a streamlined shape 7 (also slanting in a downstream direction in the direction E of the airflow) as illustrated in FIG. 3, where F illustrates the flow of suction air.

The air bled from the compressor 1 is then re-injected, in a customary manner, into a manifold (not illustrated) to cool or ventilate the engine system or to supply the air system of the aircraft equipped with said engine. The features of the air bleed system depend on the engine architecture and general specifications.

The present invention can be installed on the casing or hub, if necessary by removing a variable-pitch stage. It is applicable to any type of compressor (low pressure, high pressure, civil, military) and any type of overall architecture (jet engine, turboprop, contra-rotating, unducted fan known as "open rotor").

The invention claimed is:

1. A compressor comprising:
    at least one fixed cascade of vanes, the vanes of which are mounted on a wall and between them form airflow passages; and
    an air bleed system, which bleeds air from the passages between two vanes through openings made in the wall, the openings being discontinuous and each opening including a plurality of orifices arranged one behind the other in a direction of the airflow,
    wherein an upstream orifice of each respective opening has a cross-sectional area which is larger than areas of cross sections of downstream orifices of the respective opening, and a number and cross sections of the downstream orifices are adjusted to suit a predetermined bleed-off suction flow,
    wherein the number and cross sections of the orifices of an opening depend on a predetermined suction flow generated by the air bleed system, and
    wherein a number N of orifices of an opening satisfies the following relation:

$$\Delta\beta \cdot (S/C)/(N \cdot D) \leq 300$$

in which:
    Δβ represents deviation of the fluid on passage through the cascade of vanes;
    S/C represents relative pitch of the cascade of vanes, where S is the distance between two successive vanes and C is the chord of a vane; and
    D represents the predetermined suction flow.

2. The compressor as claimed in claim 1, wherein the upstream orifice of each opening is centered in relation to a position situated laterally near a suction side of a vane and axially at between 10% and 30% of axial length of the vane from its upstream extremity.

3. The compressor as claimed in claim 1, wherein the upstream orifice of at least some of the openings exhibits, through the wall, a shape slanting in a downstream direction.

4. The compressor as claimed in claim 1, wherein the upstream orifice of at least some of the openings exhibits, through the wall, a streamlined shape.

5. An engine, or an aircraft jet engine, comprising at least one compressor and with an air bleed system, incorporating a compressor as claimed in claim 1.

\* \* \* \* \*